US009347416B2

(12) United States Patent
Morimoto et al.

(10) Patent No.: US 9,347,416 B2
(45) Date of Patent: May 24, 2016

(54) ENGINE STARTING DEVICE FOR VEHICLE

(75) Inventors: Yasuhiro Morimoto, Wako (JP); Kohei Iizuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 644 days.

(21) Appl. No.: 13/819,232

(22) PCT Filed: Jun. 8, 2011

(86) PCT No.: PCT/JP2011/063146

§ 371 (c)(1),
(2), (4) Date: Apr. 8, 2013

(87) PCT Pub. No.: WO2012/026181

PCT Pub. Date: Mar. 1, 2012

(65) Prior Publication Data

US 2013/0186235 A1 Jul. 25, 2013

(30) Foreign Application Priority Data

Aug. 27, 2010 (JP) .................................. 2010-190379

(51) Int. Cl.
*B60K 6/48* (2007.10)
*F02N 15/02* (2006.01)
(Continued)

(52) U.S. Cl.
CPC .............. *F02N 15/022* (2013.01); *B60K 6/365* (2013.01); *B60K 6/48* (2013.01); *B60K 6/543* (2013.01);
(Continued)

(58) Field of Classification Search
CPC .......... F16H 29/04; B60K 6/48; B60K 6/543; B60K 2006/4808; B60K 2006/4825; F02N 15/04; F02N 15/022; F02N 15/023; F02N 15/025; F02N 15/043
See application file for complete search history.

(56) References Cited

U.S. PATENT DOCUMENTS 2,784,709 A * 3/1957 Albert .................... B62M 25/00
123/185.8
6,155,364 A 12/2000 Nagano et al.
8,733,209 B2 * 5/2014 Schneider ................ B60K 6/48
180/65.245

FOREIGN PATENT DOCUMENTS

GB 886847 * 1/1962
JP 09-226392 A 9/1997
(Continued)

OTHER PUBLICATIONS

Japanese Office Action dated May 28, 2014, issued in corresponding Japanese Patent Application No. 2012-530564 (3 pages).
(Continued)

*Primary Examiner* — William C Joyce
(74) *Attorney, Agent, or Firm* — Westerman, Hattori, Daniels & Adrian, LLP

(57) ABSTRACT

A vehicle engine starting device includes a drive starter gear provided on an output shaft of a transmission and a driven starter gear provided on a crankshaft of an engine are meshed, not only is it possible to start the engine by cranking the crankshaft by means of the driving force transmitted from a driven wheel without requiring a starter motor, but it is also possible to prevent the dragging of the transmission since the driving force is not transmitted to the crankshaft via the transmission. Further, since the gear ratio of the drive starter gear and the driven starter gear is set so that the rotational speed of the crankshaft attains a rotational speed that can start the engine when the vehicle speed reaches a predetermined vehicle speed for starting the engine, it is possible to reliably start the engine by cranking the crankshaft at an optimum speed.

9 Claims, 8 Drawing Sheets

(51) Int. Cl.
  *B60K 6/365* (2007.10)
  *F02D 29/02* (2006.01)
  *F02N 5/04* (2006.01)
  *F02N 11/04* (2006.01)
  *B60K 6/543* (2007.10)
  *F16H 29/04* (2006.01)

(52) U.S. Cl.
  CPC  *F02D 29/02* (2013.01); *F02N 5/04* (2013.01); *F02N 11/04* (2013.01); *B60K 2006/4808* (2013.01); *B60K 2006/4825* (2013.01); *F16H 29/04* (2013.01); *Y02T 10/626* (2013.01); *Y02T 10/6221* (2013.01); *Y02T 10/6252* (2013.01); *Y10T 74/134* (2015.01)

(56) References Cited

FOREIGN PATENT DOCUMENTS

| | | | |
|---|---|---|---|
| JP | 2003-212003 | A | 7/2003 |
| JP | 2006-009718 | A | 1/2006 |
| JP | 2009-197981 | A | 9/2009 |
| JP | 2009-257360 | * | 11/2009 |
| JP | 2010-025310 | A | 2/2010 |
| JP | 5372842 | B2 | 12/2013 |

OTHER PUBLICATIONS

International Search Report for PCT/JP2011/063146, mailing date of Sep. 13, 2011.

* cited by examiner

FIG.4 LOW STATE

ENGINE STARTING DEVICE FOR VEHICLE

TECHNICAL FIELD

The present invention relates to an engine starting device for a vehicle having a crankshaft of an engine connected to a driven wheel via an input shaft and an output shaft of a transmission.

BACKGROUND ART

In a hybrid drive device that includes an engine, a motor, a generator, and a planetary gear mechanism and drives a wheel, an arrangement in which the engine is connected to a carrier of the planetary gear mechanism, the motor and a leg shaft are connected to a ring gear of the planetary gear mechanism, the generator is connected to a sun gear of the planetary gear mechanism, and driving the generator as a starter motor enables the crankshaft to be cranked via the planetary gear mechanism and the engine to be started is known from Patent Document 1 below.

Patent Document 1: Japanese Patent Application Laid-open No. 9-226392

DISCLOSURE OF INVENTION

Problems to be Solved by the Invention

However, in the above-mentioned conventional arrangement, since it is necessary to drive the generator as a starter motor when starting the engine, there is the problem that electric power is consumed. Furthermore, since the engine, the motor, the generator, and the leg shaft are connected via the planetary gear mechanism, when the generator is driven as a starter motor in order to start the engine while traveling by means of the driving force of the motor, the driving force of the motor is offset by a portion corresponding to the driving force of the generator, and there is the problem that the drivability of the vehicle is affected.

The present invention has been accomplished in light of the above-mentioned circumstances, and it is an object thereof to enable an engine to be reliably started without requiring a starter motor while a vehicle is traveling.

Means for Solving the Problems

In order to attain the above object, according to a first aspect of the present invention, there is provided an engine starting device for a vehicle in which a transmission changes and transmits the speed of rotation of an input shaft connected to a crankshaft of an engine to an output shaft connected to a driven wheel, the transmission comprising an input side pivot point that has a variable amount of eccentricity from the axis of the input shaft and rotates together with the input shaft, a one-way clutch that is provided on the output shaft, an output side pivot point that is provided on an input member of the one-way clutch, and a connecting rod that has opposite ends connected to the input side pivot point and the output side pivot point and moves back and forth, characterized in that the engine starting device comprises a drive starter gear that is provided on the output shaft or on a differential gear connected to the output shaft, and a driven starter gear that is provided on the crankshaft and meshes with the drive starter gear.

Further, according to a second aspect of the present invention, in addition to the first aspect, the gear ratio of the drive starter gear and the driven starter gear is set so that the rotational speed of the crankshaft is a rotational speed that can start the engine when the vehicle speed attains a predetermined vehicle speed for starting the engine.

Furthermore, according to a third aspect of the present invention, in addition to the first or second aspect, the device comprises an engagement device that engages so that rotation of the drive starter gear is transmitted to the crankshaft via the driven starter gear when starting the engine and that releases engagement so that rotation of the crankshaft is not transmitted to the output shaft via the driven starter gear and the drive starter gear after the engine has started.

Moreover, according to a fourth aspect of the present invention, in addition to the third aspect, the engagement device is provided between the driven starter gear and the crankshaft.

Further, according to a fifth aspect of the present invention, in addition to the third or fourth aspect, the engagement device has unidirectional function in which the engagement device engages when the rotational speed of the output shaft exceeds the rotational speed of the crankshaft and releases engagement when the rotational speed of the crankshaft exceeds the rotational speed of the output shaft.

Furthermore, according to a sixth aspect of the present invention, in addition to any one of the first to fifth aspects, the drive starter gear is provided on a differential case of the differential gear.

Moreover, according to a seventh aspect of the present invention, in addition to any one of the first to sixth aspects, a motor gear provided on a rotating shaft of an electric motor meshes with the drive starter gear.

Further, according to an eighth aspect of the present invention, in addition to any one of the first to seventh aspects, the driven starter gear is disposed between two adjacent crank webs of the crankshaft.

It should be noted here that an eccentric disk 18 of an embodiment corresponds to the input side pivot point of the present invention, a pin 19c of the embodiment corresponds to the output side pivot point of the present invention, an outer member 22 of the embodiment corresponds to the input member of the present invention, a starter clutch 36 of the embodiment corresponds to the engagement device of the present invention, a motor/generator MG of the embodiment corresponds to the electric motor of the present invention, and a continuously variable transmission T of the embodiment corresponds to the transmission of the present invention.

Effects of the Invention

In accordance with the first aspect of the present invention, since the transmission includes the input side pivot point, which has a variable amount of eccentricity from the axis of the input shaft and rotates together with the input shaft, the one-way clutch provided on the output shaft, the output side pivot point provided on the input member of the one-way clutch, and the connecting rod, which has opposite ends connected to the input side pivot point and the output side pivot point and moves back and forth, it is possible to transmit rotation of the input shaft to the output shaft via the connecting rod and the one-way clutch and change the gear ratio by changing the amount of eccentricity of the input side pivot point. Although the transmission includes the one-way clutch on the output shaft and driving force cannot be transmitted from the output shaft side to the input shaft side, since the drive starter gear provided on the output shaft or the differential gear and the driven starter gear provided on the crankshaft of the engine are meshed, it becomes possible to start the engine by cranking the crankshaft via the drive starter gear and the driven starter gear by means of the driving force transmitted from the driven wheel without going through the transmission and without requiring a starter motor. Furthermore, since the driven starter gear functions as a flywheel of the crankshaft, an existing flywheel can be made small or eliminated.

Furthermore, in accordance with the second aspect of the present invention, since the gear ratio of the drive starter gear and the driven starter gear is set so that the rotational speed of the crankshaft attains a rotational speed that can start the engine when the vehicle speed reaches a predetermined vehicle speed for starting the engine, it is possible to carry out re-starting of the engine smoothly.

Moreover, in accordance with the third aspect of the present invention, since the engagement device engages so that rotation of the drive starter gear is transmitted to the crankshaft via the driven starter gear when starting the engine, starting can be carried out by cranking the crankshaft by means of the driving force transmitted from the output shaft, and since after starting the engine the engagement device releases engagement so that rotation of the crankshaft is not transmitted to the output shaft via the driven starter gear and the drive starter gear, the driving force of the engine is not transmitted simultaneously to both a path going through the transmission and a path going through the driven starter gear and the drive starter gear.

Furthermore, in accordance with the fourth aspect of the present invention, since the engagement device is provided between the driven starter gear and the crankshaft, releasing engagement of the engagement device when traveling by means of the engine enables dragging of the driven starter gear and the drive starter gear to be prevented.

Moreover, in accordance with the fifth aspect of the present invention, since the engagement device having the unidirectional function engages when the rotational speed of the output shaft exceeds the rotational speed of the crankshaft, starting can be carried out by cranking the crankshaft while traveling with the engine stopped, and since the engagement device releases engagement when the rotational speed of the crankshaft exceeds the rotational speed of the output shaft, the engagement device does not unnecessarily engage while traveling by means of the engine.

Furthermore, in accordance with the sixth aspect of the present invention, since the drive starter gear is provided on the differential case of the differential gear, it is possible to make the lengths of the drive shafts extending to the left and right uniform by making the position of the differential gear closer to the center in the vehicle width direction.

Moreover, in accordance with the seventh aspect of the present invention, since the motor gear provided on the rotating shaft of the electric motor meshes with the drive starter gear, it is possible to start the engine by cranking the crankshaft by means of the driving force of the electric motor even when the vehicle is stopped.

Furthermore, in accordance with the eighth aspect of the present invention, not only is it possible to minimize any increase in the dimension in the crankshaft axis direction of the engine since the driven starter gear is disposed between the two adjacent crank webs of the crankshaft, but it is also possible to eliminate or make smaller an existing flywheel provided on the crankshaft since the driven starter gear exhibits a function as a flywheel.

EXPLANATION OF REFERENCE NUMERALS AND SYMBOLS

Figure 1:
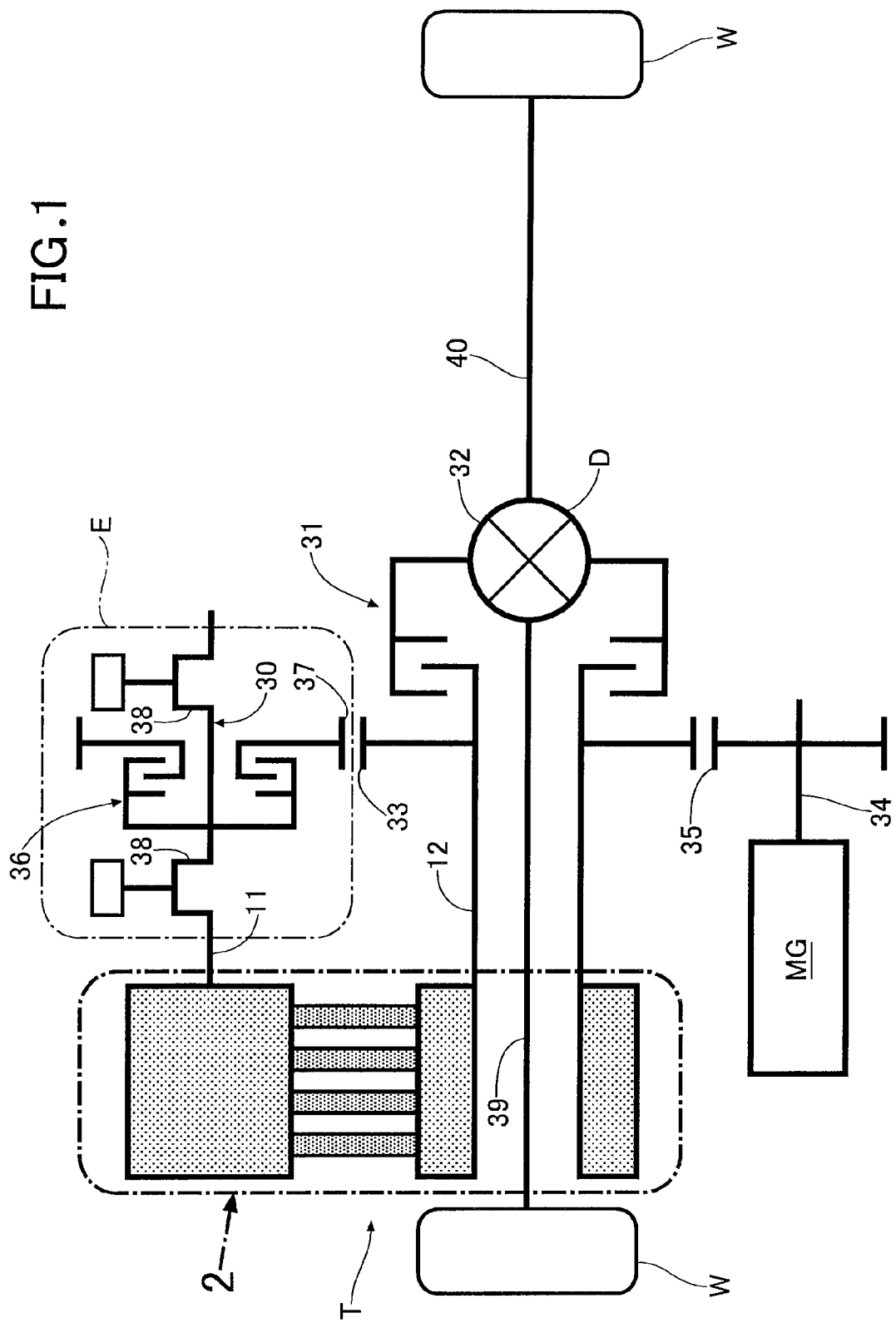
FIG. 1 is a skeleton diagram of a power system for traveling for a vehicle. (first embodiment)

11 Input shaft
12 Output shaft
18 Eccentric disk (input side pivot point)
19 Connecting rod
19c Pin (output side pivot point)
21 One-way clutch
22 Outer member (input member)
30 Crankshaft
32 Differential case
33 Drive starter gear
34 Rotating shaft
35 Motor gear
36 Starter clutch (engagement device)
37 Driven starter gear
38 Crank web
D Differential gear
E Engine
MG Motor/generator (electric motor)
T Continuously variable transmission (transmission)
W Driven wheel

BEST MODE FOR CARRYING OUT THE INVENTION

A first embodiment of the present invention is explained below by reference to FIG. 1 to FIG. 6.

Embodiment 1

As shown in FIG. 1, a power system for traveling that drives left and right driven wheels W and W of a front-engined front-wheel drive hybrid vehicle includes an engine E, a motor/generator MG, a continuously variable transmission T, and a differential gear D.

A crankshaft 30 of the engine E is connected in series to an input shaft 11 of the continuously variable transmission T, and an output shaft 12 of the continuously variable transmission T is connected to a differential case 32 of the differential gear D via a starting clutch 31. A motor gear 35 provided on a rotating shaft 34 of the motor/generator MG meshes with a drive starter gear 33 provided on the output shaft 12, and a driven starter gear 37 that is relatively rotatably supported on the crankshaft 30 and can be coupled to the crankshaft 30 via a starter clutch 36 meshes with the drive starter gear 33.

The starter clutch 36 and the driven starter gear 37 are disposed between two adjacent crank webs 38 and 38 of the crankshaft 30. Among left and right drive shafts 39 and 40 extending from the differential gear D, one drive shaft 39 relatively rotatably extends through the interior of the output shaft 12, which is hollow, of the continuously variable transmission T.

The starter clutch 36 is formed from a hydraulically controlled wet multi-plate type clutch and engages only when starting the engine E, engagement otherwise being released.

The structure of the continuously variable transmission T is now explained by reference to FIGS. 2 to 6.

Figure 2:
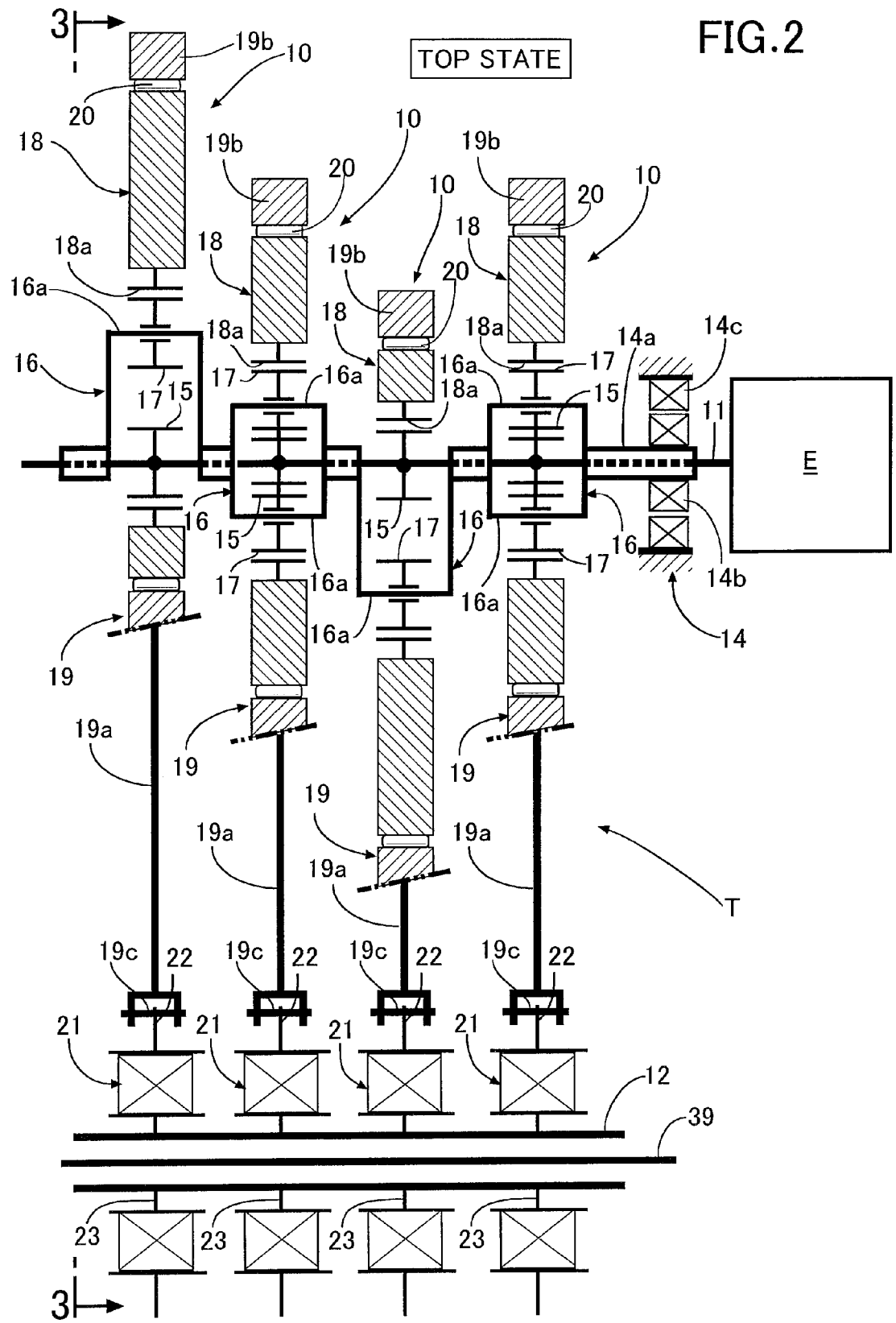
FIG. 2 is a detailed diagram of part 2 in FIG. 1. (first embodiment)
Figure 3:
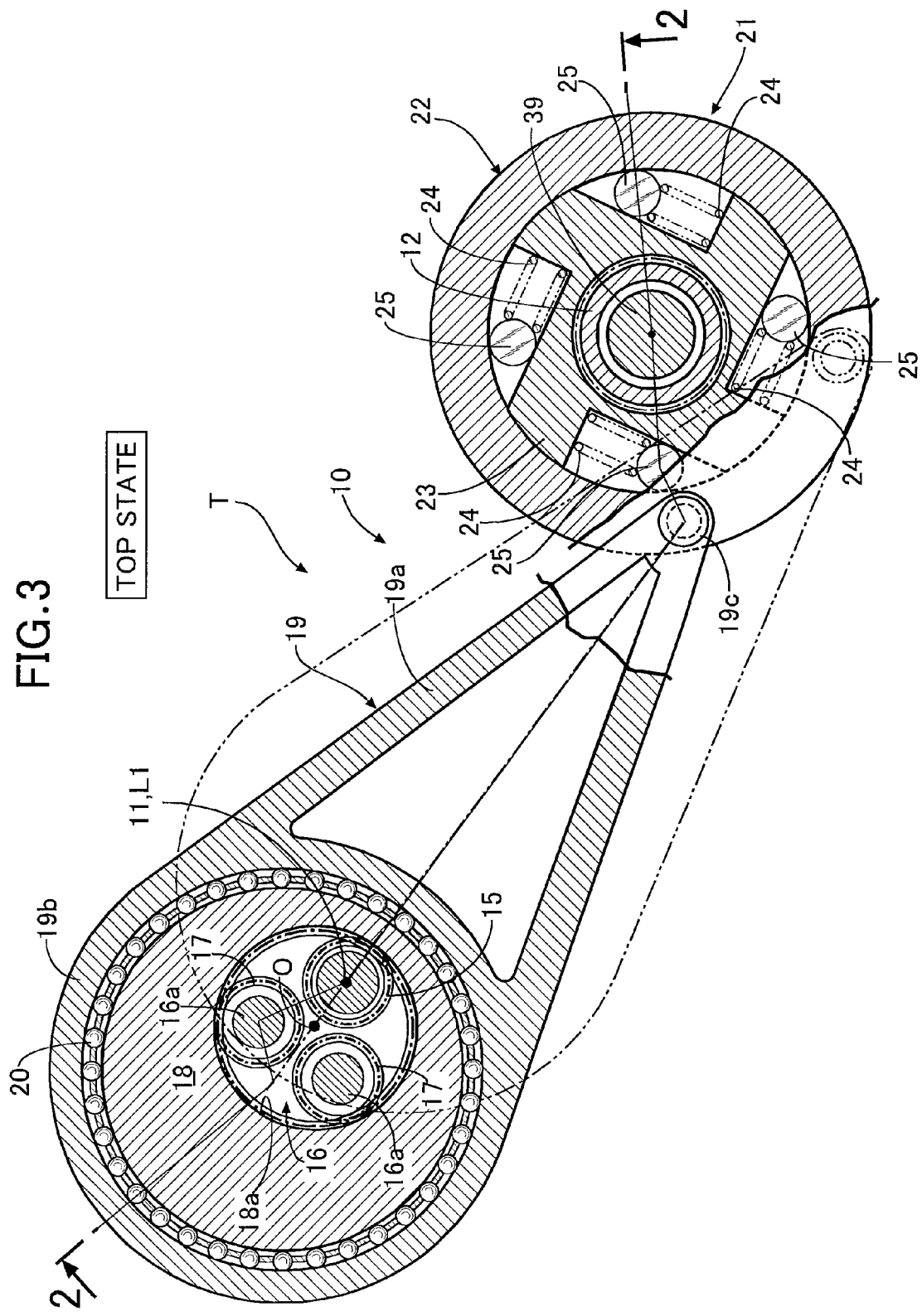
FIG. 3 is a sectional view along line 3-3 in FIG. 2 (TOP state). (first embodiment)

As shown in FIG. 2 and FIG. 3, the continuously variable transmission T of this embodiment is formed by superimposing in the axial direction a plurality (four in the embodiment) of transmission units 10 having the same structure, these transmission units 10 including in common the input shaft 11 and the output shaft 12, which are disposed in parallel to each other, and rotation of the input shaft 11 is decreased in speed or increased in speed and transmitted to the output shaft 12.

The structure of one transmission unit 10 is explained below as being representative thereof. The input shaft 11, which is connected to the crankshaft 30 of the engine E and rotated, relatively rotatably extends through the interior of a hollow rotating shaft 14a of a transmission actuator 14 such as an electric motor. A rotor 14b of the transmission actuator 14 is fixed to the rotating shaft 14a, and a stator 14c is fixed to a casing. The rotating shaft 14a of the transmission actuator 14 can rotate at the same speed as that of the input shaft 11 and can rotate relative to the input shaft 11 at a different speed thereto.

A first pinion 15 is fixed to the input shaft 11 extending through the rotating shaft 14a of the transmission actuator 14, and a crank-shaped carrier 16 is connected to the rotating shaft 14a of the transmission actuator 14 so as to straddle the first pinion 15. Two second pinions 17 and 17 having the same diameter as that of the first pinion 15 are supported, via pinion pins 16a and 16a, at positions that form an equilateral triangle in cooperation with the first pinion 15, and a ring gear 18a formed eccentrically in the interior of a disk-shaped eccentric disk 18 meshes with the first pinion 15 and the second pinions 17 and 17. A ring portion 19b provided at one end of a rod portion 19a of a connecting rod 19 is relatively rotatably fitted around an outer peripheral face of the eccentric disk 18 via a ball bearing 20.

A one-way clutch 21 provided on the outer periphery of the output shaft 12 includes a ring-shaped outer member 22 pivotably supported on the rod portion 19a of the connecting rod 19 via a pin 19c, an inner member 23 disposed in the interior of the outer member 22 and fixed to the output shaft 12, and rollers 25 disposed in wedge-shaped spaces formed between an arc face of the inner periphery of the outer member 22 and a plane of the outer periphery of the inner member 23 and urged by springs 24.

As is clear from FIG. 2, the four transmission units 10 have the crank-shaped carrier 16 in common, but the phases of the eccentric disks 18 supported on the carrier 16 via the second pinions 17 and 17 are different by 90° for each transmission unit 10. For example, in FIG. 2, the eccentric disk 18 of the transmission unit 10 at the left end is displaced upward in the figure relative to the input shaft 11, the eccentric disk 18 of the transmission unit 10 third from the left is displaced downward in the figure relative to the input shaft 11, and the eccentric disks 18 and 18 of the transmission units 10 and 10 second and fourth from the left are at intermediate positions in the vertical direction.

The operation of the embodiment of the present invention having the above-mentioned arrangement is now explained.

First, the operation of one transmission unit 10 of the continuously variable transmission T is explained. When the rotating shaft 14a of the transmission actuator 14 is rotated relative to the input shaft 11, the carrier 16 rotates around an axis L1 of the input shaft 11. In this process, a center O of the carrier 16, that is, the center of the equilateral triangle formed by the first pinion 15 and the two second pinions 17 and 17, rotates around the axis L1 of the input shaft 11.

Figure 4:
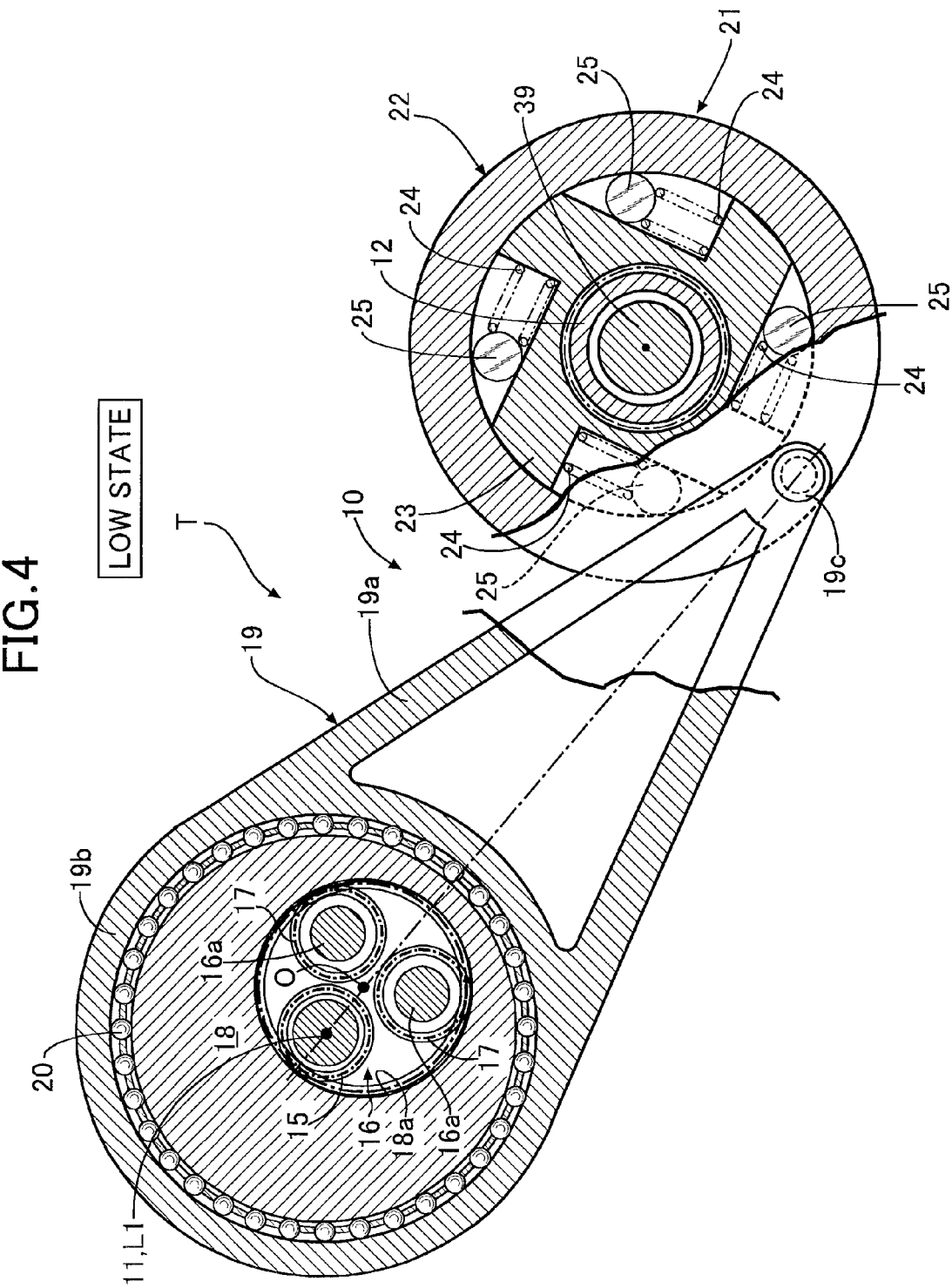
FIG. 4 is a sectional view along line 3-3 in FIG. 2 (LOW state). (first embodiment)
Figure 5:
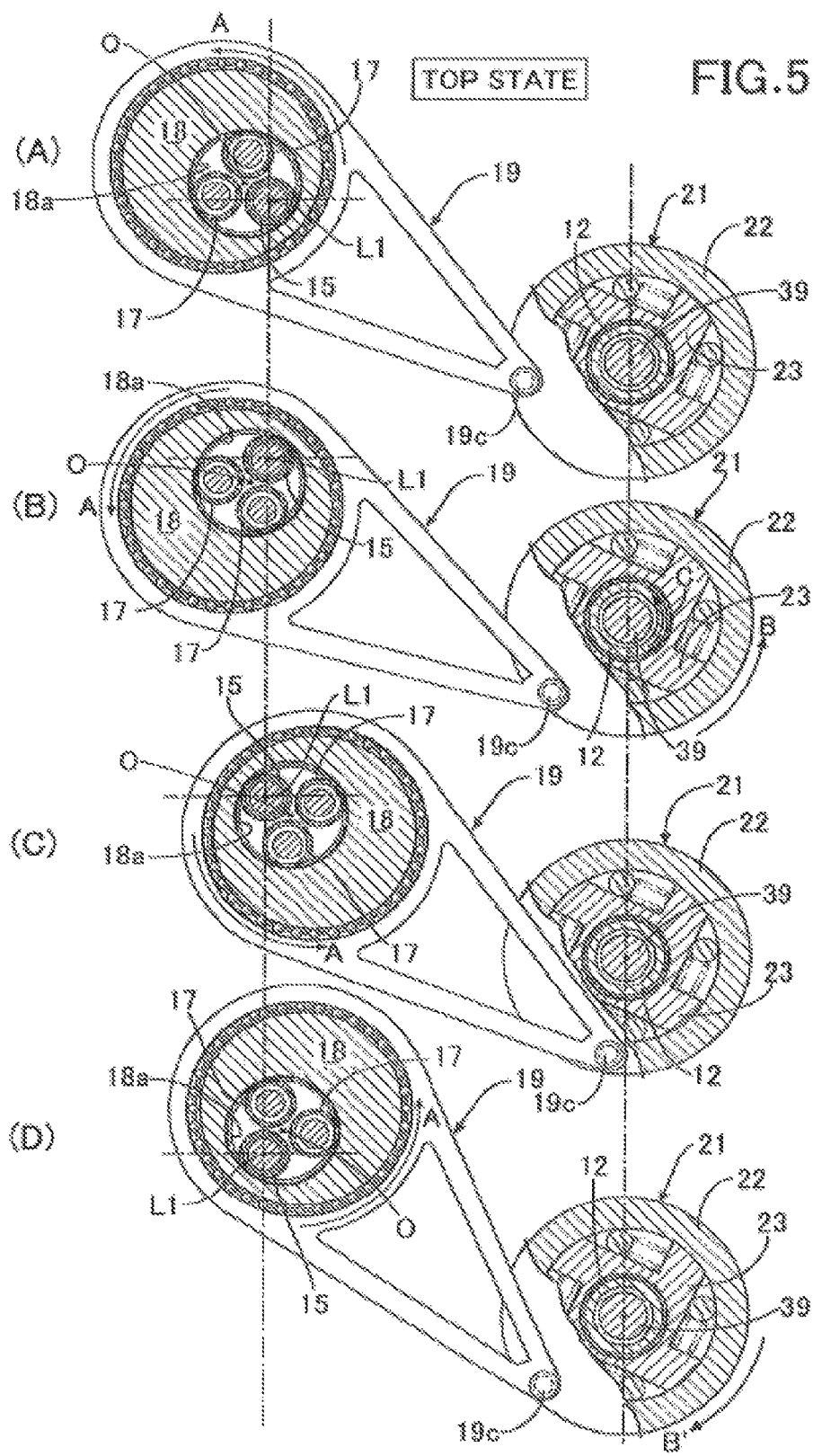
FIG. 5 is a diagram for explaining the operation in the TOP state. (first embodiment)
Figure 6:
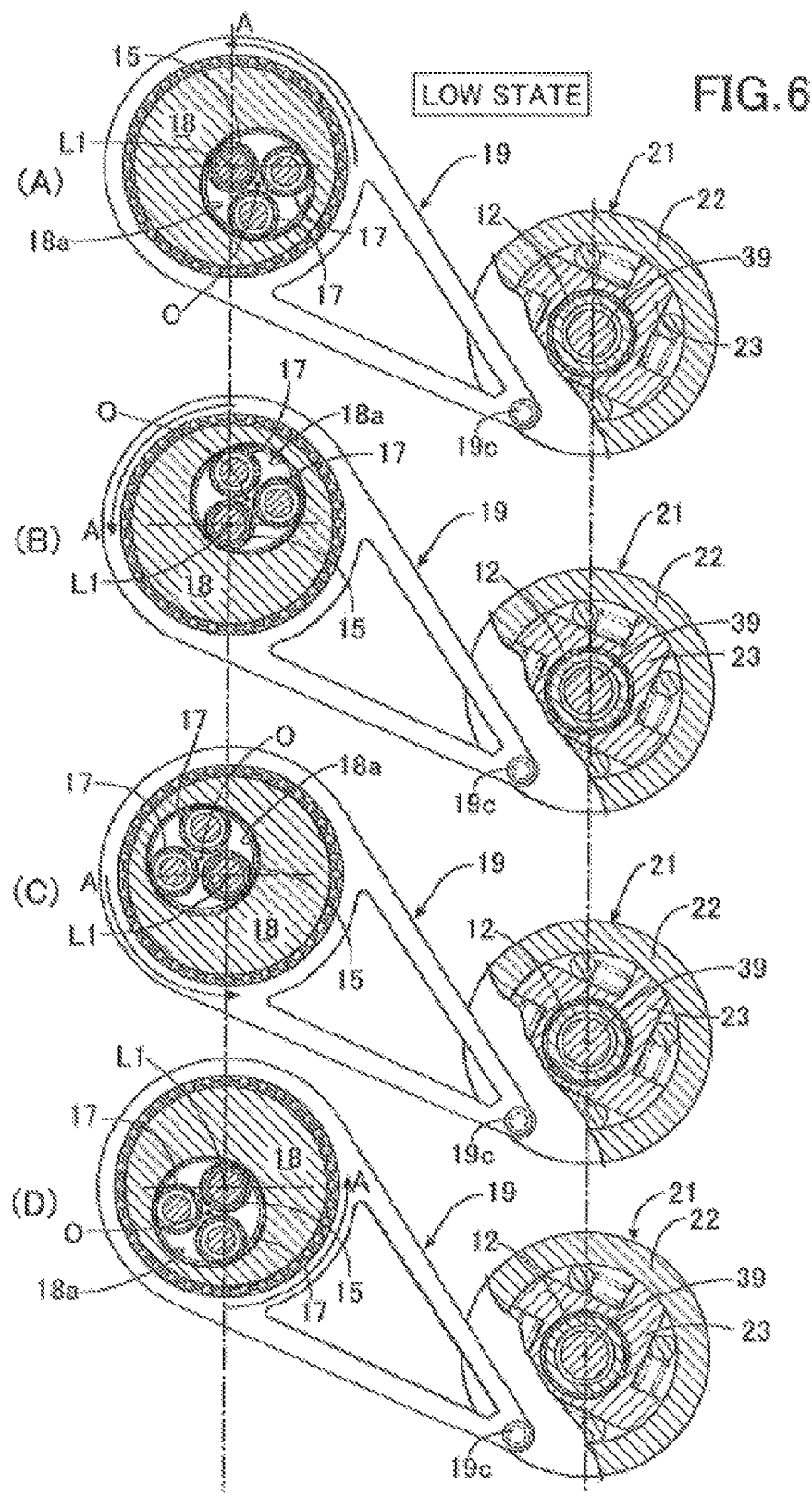
FIG. 6 is a diagram for explaining the operation in the LOW state. (first embodiment)

FIG. 3 and FIG. 5 show a state in which the center O of the carrier 16 is present on the side opposite to the output shaft 12 with respect to the first pinion 15 (that is, the input shaft 11); in this state the amount of eccentricity of the eccentric disk 18 relative to the input shaft 11 becomes a maximum, and the ratio of the transmission T attains a TOP state. FIG. 4 and FIG. 6 show a state in which the center O of the carrier 16 is present on the same side as the output shaft 12 with respect to the first pinion 15 (that is, the input shaft 11); in this state the amount of eccentricity of the eccentric disk 18 relative to the input shaft 11 becomes a minimum, and the ratio of the transmission T attains a LOW state.

In the TOP state shown in FIG. 5, when the input shaft 11 is rotated by the engine E and the rotating shaft 14a of the transmission actuator 14 is rotated at the same speed as that of the input shaft 11, the input shaft 11, the rotating shaft 14a, the carrier 16, the first pinion 15, the two second pinions 17 and 17, and the eccentric disk 18 rotate eccentrically in the counterclockwise direction (see arrow A) as a unit with the input shaft 11 as a center. While rotating from the state of FIG. 5 (A) to FIG. 5 (C) via FIG. 5 (B), the connecting rod 19 having the ring portion 19b relatively rotatably supported on the outer periphery of the eccentric disk 18 via the ball bearing 20 rotates the outer member 22 pivotably supported at the extremity of the rod portion 19a via the pin 19c in the counterclockwise direction (see arrow B). FIG. 5 (A) and FIG. 5 (C) show opposite ends of rotation in the arrow B direction of the outer member 22.

When the outer member 22 rotates in the arrow B direction as described above, since the rollers 25 bite into the wedge-shaped space between the outer member 22 and the inner member 23 of the one-way clutch 21, rotation of the outer member 22 is transmitted to the output shaft 12 via the inner member 23, and the output shaft 12 rotates in the counterclockwise direction (see arrow C).

When the input shaft 11 and the first pinion 15 further rotate, the eccentric disk 18 having the ring gear 18a meshed with the first pinion 15 and the second pinions 17 and 17 rotates eccentrically in the counterclockwise direction (see arrow A). While rotating from the state of FIG. 5 (C) to FIG. 5 (A) via FIG. 5 (D), the connecting rod 19 having the ring portion 19b relatively rotatably supported on the outer periphery of the eccentric disk 18 via the ball bearing 20 rotates the outer member 22 pivotably supported at the extremity of the rod portion 19a via the pin 19c in the clockwise direction (see arrow B'). FIG. 5 (C) and FIG. 5 (A) show opposite ends, in the arrow B' direction, of rotation of the outer member 22.

When the outer member 22 rotates in the arrow B' direction as described above, the rollers 25 are pushed out from the wedge-shaped space between the outer member 22 and the inner member 23 while compressing the springs 24, the outer member 22 slips against the inner member 23, and the output shaft 12 does not rotate.

As described above, when the outer member 22 rotates back and forth, since the output shaft 12 rotates in the counterclockwise direction (see arrow C) only if the rotational direction of the outer member 22 is the counterclockwise direction (see arrow B), the output shaft 12 rotates intermittently.

FIG. 6 shows the operation when the transmission T is operated in the LOW state. In this process, since the position of the input shaft 11 coincides with the center of the eccentric disk 18, the amount of eccentricity of the eccentric disk 18 relative to the input shaft 11 becomes zero. When the input shaft 11 is rotated by the engine E in this state and the rotating shaft 14a of the transmission actuator 14 is rotated at the same speed as that of the input shaft 11, the input shaft 11, the rotating shaft 14a, the carrier 16, the first pinion 15, the two second pinions 17 and 17, and the eccentric disk 18 rotate eccentrically in the counterclockwise direction (see arrow A) as a unit with the input shaft 11 as the center. However, since the amount of eccentricity of the eccentric disk 18 is zero, the stroke of back and forth movement of the connecting rod 19 becomes zero, and the output shaft 12 does not rotate.

Therefore, if the transmission actuator 14 is driven so as to set the position of the carrier 16 between the TOP state of FIG. 3 and the LOW state of FIG. 4, it becomes possible to run at any ratio between a zero ratio and a predetermined ratio.

In the continuously variable transmission T, since the phases of the eccentric disks 18 of the four transmission units 10, which are arranged in parallel to each other, are displaced from each other by 90°, the four transmission units 10 transmit a driving force in turn, that is, there is always one of the four one-way clutches 21 that is in an engaged state, thus enabling the output shaft 12 to be rotated continuously.

In order to make the vehicle travel forward, rotation of the crankshaft 30 of the engine E is transmitted to the input shaft 11 of the continuously variable transmission T in a state in which engagement of the starter clutch 36 is released, and rotation of the output shaft 12 that has been changed in speed by a given gear ratio may be transmitted to the driven wheels W and W via the engaged starting clutch 31, the differential gear D, and the drive shafts 39 and 40. In this process, driving the motor/generator MG as a motor to thus transmit the rotation of the rotating shaft 34 to the drive starter gear 33 via the motor gear 35 enables the driving force of the engine E to be assisted by the driving force of the motor/generator MG.

Furthermore, driving the motor/generator MG as a motor in a state in which the starting clutch 31 is engaged and engagement of the starter clutch 36 is released enables the vehicle to travel forward or in reverse by means of the driving force of the motor/generator MG alone. Moreover, driving the motor/generator MG as a generator when decelerating the vehicle enables the kinetic energy of the vehicle to be recovered as electrical energy by virtue of regenerative braking.

In order to start the engine E in a state in which the vehicle is stopped, the motor/generator MG may be driven as a starter motor in a state in which engagement of the starting clutch 31 is released and the starter clutch 36 is engaged so as to couple the driven starter gear 37 to the crankshaft 30. This enables rotation of the rotating shaft 34 of the motor/generator MG to be transmitted to the crankshaft 30 via the motor gear 35, the drive starter gear 33, the driven starter gear 37, and the starter clutch 36, thereby cranking the crankshaft 30 to thus start the engine E.

In general, the hybrid vehicle is started by means of the driving force of the motor/generator MG, which has high torque at low speed, and when the vehicle speed attains a predetermined value (e.g. 20 km/h) the engine E is started and there is a transition to traveling by means of the driving force of the engine E. Starting the engine E after the vehicle has started is carried out without driving the motor/generator MG as a starter motor. That is, if the starter clutch 36 is engaged when the vehicle speed attains a predetermined value after the vehicle has started, the driving forces of the driven wheels W and W are transmitted to the crankshaft 30 via the drive shafts 39 and 40, the differential gear D, the starting clutch 31, the input shaft 11, the drive starter gear 33, the driven starter gear 37, and the starter clutch 36, thereby cranking the crankshaft 30 to thus start the engine E.

Since the gear ratio of the drive starter gear 33 and the driven starter gear 37 is set so that at a standard vehicle speed (e.g. 20 km/h) at which the engine E is re-started after the vehicle has started, the cranking speed of the crankshaft 30 attains a speed that can start the engine E, re-starting of the engine E can be carried out smoothly. Furthermore, the continuously variable transmission T of the present embodiment has a structure in which rotation of the driven wheels W and W cannot be transmitted back to the engine E side, but transmitting rotation of the driven wheels W and W back to the crankshaft 30 by use of the drive starter gear 33 and the driven starter gear 37 enables the engine E to be started without driving the motor/generator MG as a starter motor, thereby contributing to a reduction in electricity consumption.

If a vehicle includes a transmission that can transmit back the driving force, as in a belt type continuously variable transmission or a stepped transmission, an engine E can be started by transmitting the driving forces of driven wheels W and W back to a crankshaft 30 via the transmission, but in this case since it is necessary to transmit the driving force back via a long power transmission path having a pulley, a belt, a gear, a clutch, etc., there is the problem that the kinetic energy of the vehicle is wasted due to friction in the power transmission path.

When the engine E is started in this way, releasing engagement of the starter clutch 36 enables the vehicle to travel by transmitting the driving force of the engine E to the driven wheels W and W via the continuously variable transmission T. Moreover, transmission does not occur simultaneously in both a path in which the driving force of the engine E goes through the continuously variable transmission T and a path in which it goes through the driven starter gear 37 and the drive starter gear 33.

Furthermore, since the driven starter gear 37 can be engaged with and disengaged from the crankshaft 30 via the starter clutch 36, releasing engagement of the starter clutch 36 makes it possible to prevent the engine E or the continuously variable transmission T from being dragged when traveling by means of the driving force of the motor/generator MG. Moreover, since the starter clutch 36 and the driven starter gear 37 are disposed between the two adjacent crank webs 38 and 38 of the crankshaft 30, it is possible to minimize any increase in the dimension in the crankshaft axis direction of the engine E. Furthermore, since the driven starter gear 37 and the starter clutch 36 provided on the crankshaft 30 exhibit a function as a flywheel, it is possible to eliminate or make smaller an existing flywheel provided on the crankshaft 30.

Moreover, since the starter clutch 36 is provided between the driven starter gear 37 and the crankshaft 30, it is possible to prevent dragging of the driven starter gear 37 and the drive starter gear 33 when traveling by means of the engine E. That is, if the starter clutch 36 were provided between the drive starter gear 33 and the output shaft 12, the driven starter gear 37 and the drive starter gear 33 would always be dragged while the engine E was running, and the fuel consumption would be degraded.

Figure 7:
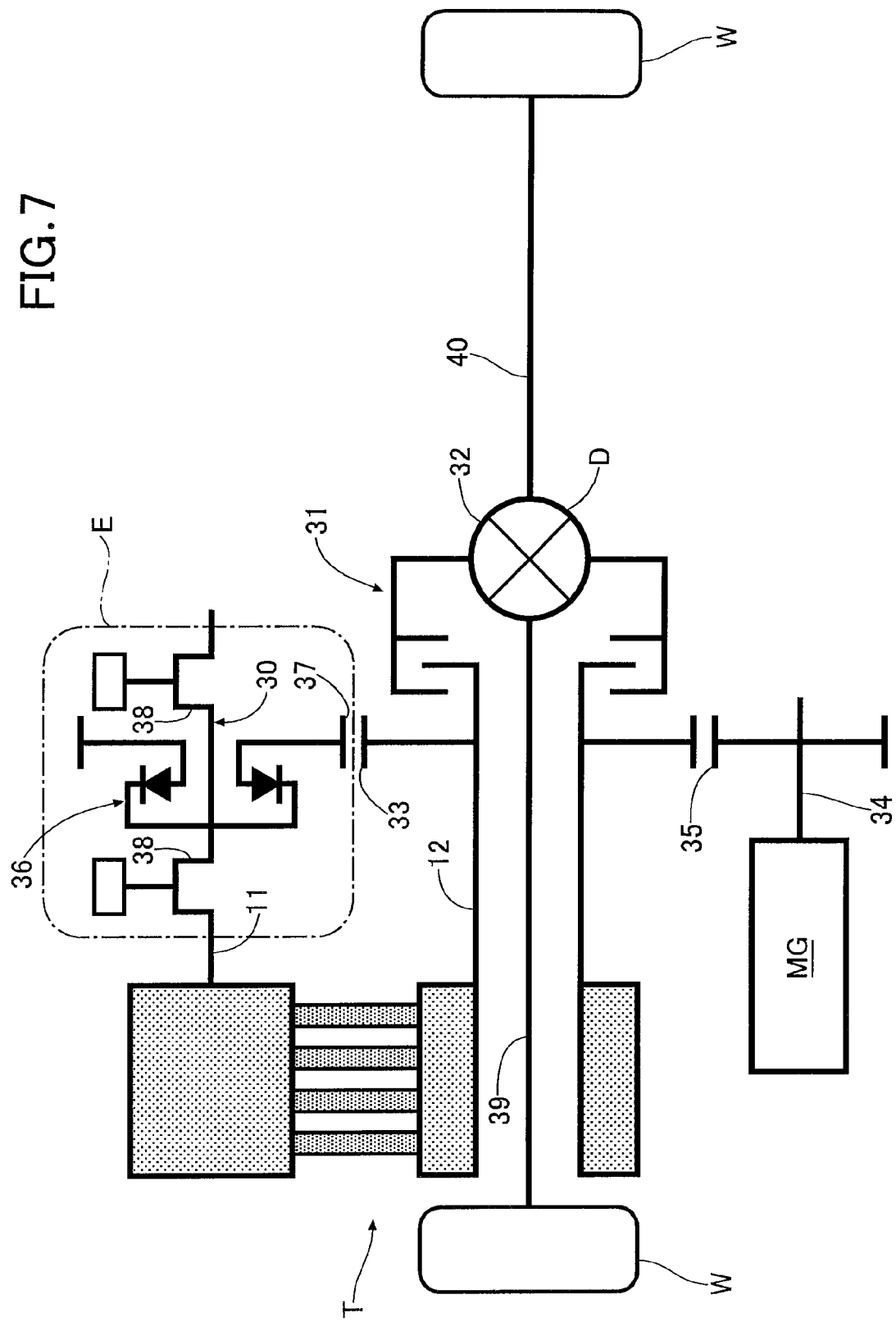
FIG. 7 is a skeleton diagram of a power system for traveling for a vehicle. (second embodiment)

A second embodiment of the present invention is now explained by reference to FIG. 7.

Embodiment 2

The starter clutch 36 of the first embodiment is formed from a hydraulically controlled wet multi-plate type clutch, but a starter clutch 36 of the second embodiment is formed from one in which a sprag or roller type one-way clutch is provided with an engagement release mechanism.

When rotation is transmitted from a drive starter gear 33 provided on an output shaft 12 to a driven starter gear 37 provided on a crankshaft 30, the starter clutch 36, which is formed from an engagement release mechanism-equipped one-way clutch, can start an engine E by carrying out engagement in the same manner as in a usual one-way clutch and cranking the crankshaft 30. Furthermore, when the engine is started and the rotational speed of the crankshaft 30 increases, releasing engagement by means of the usual function of a one-way clutch can prevent rotation of the crankshaft 30 from being transmitted to the output shaft 12 via the driven starter gear 37 and the drive starter gear 33, thereby enabling power transmission to be carried out via a transmission T without problems.

If the starter clutch 36 were a usual one-way clutch, when the rotational speed of the driven starter gear 37 driven by the output shaft 12 via the drive starter gear 33 on a down slope, etc. while traveling by means of the engine E exceeded the rotational speed of the crankshaft 30, there is a possibility that the one-way clutch would engage to over-rev the engine E. However, since the starter clutch 36 of this embodiment is formed from an engagement release mechanism-equipped one-way clutch, it is possible to switch over the one-way clutch, which is by nature engaged on a downward slope, etc., to a non-engaged state by means of an electrical signal. Therefore, when there is a possibility of the engine E over-revving due to rotation that is transmitted back from the output shaft 12 side, it is possible to forcibly release engagement of the starter clutch 36, thus avoiding over-revving of the engine E.

In accordance with this embodiment, use of the starter clutch 36 formed from an engagement release mechanism-equipped one-way clutch instead of a starter clutch 36 formed from a hydraulically controlled wet multi-plate type clutch makes hydraulically controlled equipment unnecessary, thus enabling the structure to be simplified.

Figure 8:
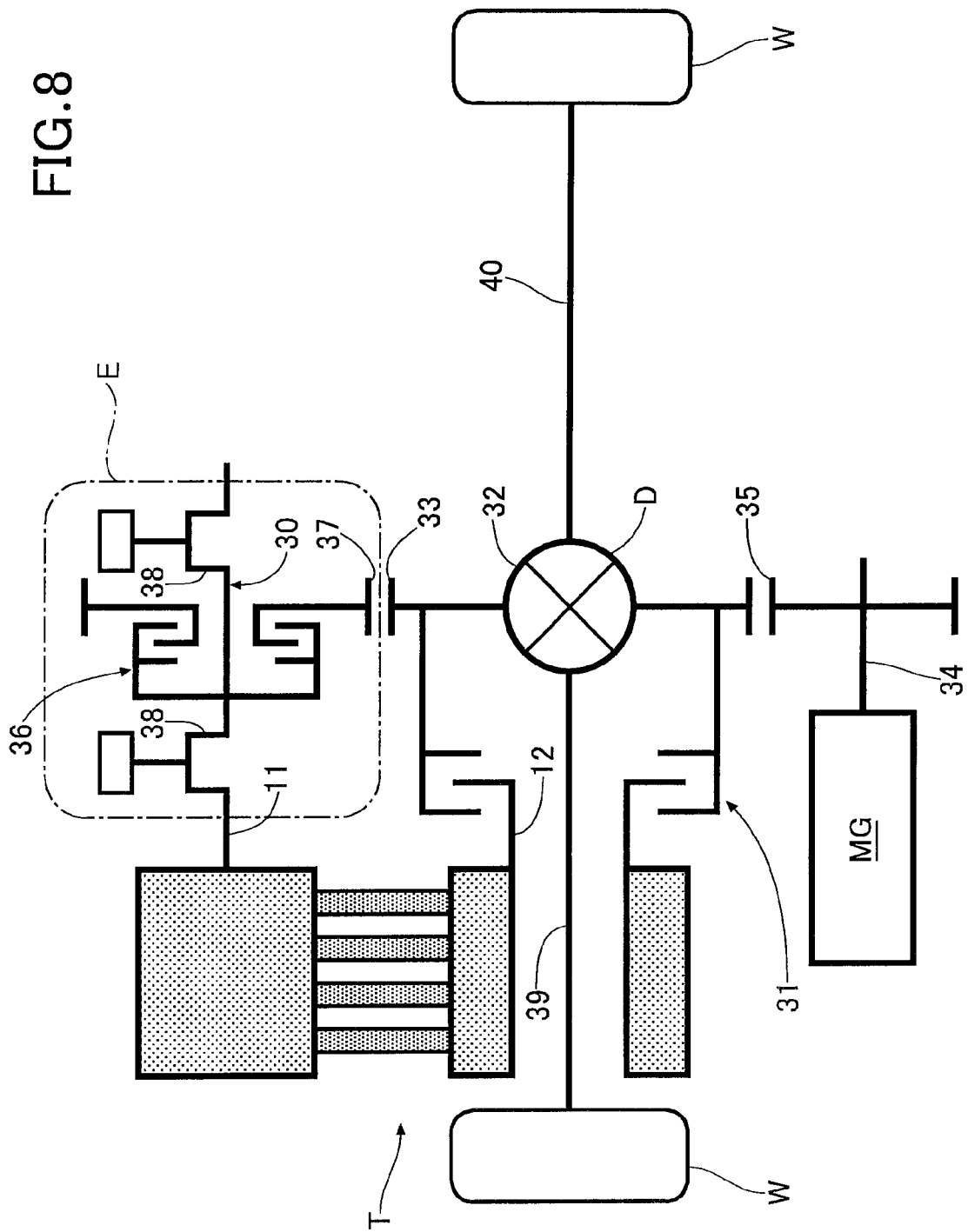
FIG. 8 is a skeleton diagram of a power system for traveling for a vehicle. (third embodiment)

A third embodiment of the present invention is now explained by reference to FIG. 8.

Embodiment 3

In the first embodiment the drive starter gear 33 is provided on the output shaft 12, but in the third embodiment a drive starter gear 33 is provided on a differential case 32 of a differential gear D.

Moving the position of the drive starter gear 33 from an output shaft 12 to the differential case 32 in this way enables the position of the differential gear D to be moved toward the center in the vehicle width direction compared with the first embodiment, thereby making the lengths of left and right drive shafts 39 and 40 extending from the differential gear D uniform.

Embodiments of the present invention are explained above, but the present invention may be modified in a variety of ways as long as the modifications do not depart from the spirit and scope thereof.

For example, in the embodiments the output shaft 12 is disposed on the outer periphery of the left-hand side drive shaft 39, but it may be disposed on the outer periphery of the right-hand side drive shaft 40.

The invention claimed is:

1. An engine starting device for a vehicle in which a transmission changes and transmits the speed of rotation of an input shaft connected to a crankshaft of an engine to an output shaft connected to a driven wheel, the transmission comprising an input side pivot point that has a variable amount of eccentricity from the axis of the input shaft and rotates together with the input shaft, a one-way clutch that is provided on the output shaft, an output side pivot point that is provided on an input member of the one-way clutch, and a connecting rod that has opposite ends connected to the input side pivot point and the output side pivot point and moves back and forth, wherein the engine starting device comprising a drive starter gear that is provided on the output shaft or on a differential gear connected to the output shaft, and a driven starter gear that is provided on the crankshaft and meshes with the drive starter gear.

2. The engine starting device for a vehicle according to claim 1, wherein the gear ratio of the drive starter gear and the driven starter gear is set so that the rotational speed of the crankshaft is a rotational speed that can start the engine when the vehicle speed attains a predetermined vehicle speed for starting the engine.

3. The engine starting device for a vehicle according to claim 1, wherein the drive starter gear is provided on a differential case of the differential gear.

4. The engine starting device for a vehicle according to claim 1, wherein a motor gear provided on a rotating shaft of an electric motor meshes with the drive starter gear.

5. The engine starting device for a vehicle according to claim 1, wherein the driven starter gear is disposed between two adjacent crank webs of the crankshaft.

6. The engine starting device for a vehicle according to claim 1, further comprising an engagement device that engages so that rotation of the drive starter gear is transmitted to the crankshaft via the driven starter gear when starting the engine and that releases engagement so that rotation of the crankshaft is not transmitted to the output shaft via the driven starter gear and the drive starter gear after the engine has started.

7. The engine starting device for a vehicle according to claim 6, wherein an engagement device is provided between the driven starter gear and the crankshaft.

8. The engine starting device for a vehicle according to claim 3, wherein the engagement device has a unidirectional function in which the engagement device engages when the rotational speed of the output shaft exceeds the rotational speed of the crankshaft and releases engagement when the rotational speed of the crankshaft exceeds the rotational speed of the output shaft.

9. The engine starting device for a vehicle according to claim 6, wherein an engagement device having a unidirectional function in which the engagement device engages when the rotational speed of the output shaft exceeds the rotational speed of the crankshaft and releases engagement when the rotational speed of the crankshaft exceeds the rotational speed of the output shaft.

* * * * *